United States Patent
Shen (10) Patent No.: US 9,052,396 B2
(45) Date of Patent: Jun. 9, 2015

(54) APPARATUS FOR ULTRASOUND HARMONIC IMAGING AND METHOD THEREOF

(75) Inventor: Che-Chou Shen, Taipei (TW)

(73) Assignee: National Taiwan University of Science and Technology, Taipei (TW)

(*) Notice: Subject to any disclaimer, the term of this patent is extended or adjusted under 35 U.S.C. 154(b) by 530 days.

(21) Appl. No.: 13/478,123

(22) Filed: May 23, 2012

(65) Prior Publication Data

US 2013/0208562 A1 Aug. 15, 2013

(30) Foreign Application Priority Data

Feb. 13, 2012 (TW) .............................. 101104563 A (51) Int. Cl.
G03B 42/06 (2006.01)
G01S 15/89 (2006.01)
G01S 7/52 (2006.01)
G01S 15/10 (2006.01)

(52) U.S. Cl.
CPC ........... G01S 15/8954 (2013.01); G01S 15/104 (2013.01); G01S 7/52038 (2013.01)

(58) Field of Classification Search
CPC ............ G01S 7/52039; G01S 15/8959; G01S 15/8961; G01S 15/8954; G01S 15/104
USPC ............................................... 367/7; 600/458
See application file for complete search history.

(56) References Cited

U.S. PATENT DOCUMENTS

| | | | |
|---|---|---|---|
| 6,213,947 B1 | 4/2001 | Phillips | |
| 6,241,674 B1 | 6/2001 | Phillips et al. | |
| 6,702,745 B1 * | 3/2004 | Smythe | 600/443 |
| 6,960,169 B2 * | 11/2005 | Mao et al. | 600/458 |
| 7,037,265 B2 | 5/2006 | Hao et al. | |
| 7,066,886 B2 | 6/2006 | Song et al. | |
| 7,094,204 B2 | 8/2006 | Banjanin et al. | |
| 7,303,529 B2 * | 12/2007 | Kawagishi et al. | 600/443 |
| 7,713,199 B2 | 5/2010 | Mo et al. | |

(Continued)

FOREIGN PATENT DOCUMENTS

EP 1739455 1/2007

OTHER PUBLICATIONS

Nowicki et al., "Harmonic Imaging Using Multitone Nonlinear Coding," Ultrasound in Med. & Biol. 33(7), 2007, pp. 1112-1122.
Yeh et al., "Dual High-Frequency Difference Excitation for Contrast Detection," IEEE Transactions on Ultrasonics, Ferroelectrics, and Frequency Control 55 (10), Oct. 2008 pp. 2164-2176.

(Continued)

Primary Examiner — Mark Hellner
(74) Attorney, Agent, or Firm — Jianq Chyun IP Office (57) ABSTRACT

An apparatus for ultrasound harmonic imaging and method therefor are provided. The apparatus includes a signal transmitting unit, a signal receiving unit and an image processing unit. The signal transmitting unit transmits a linearly or non-linearly frequency modulated up-sweep signal and a linearly or non-linearly frequency modulated down-sweep signal to a reflective body. The signal receiving unit receives an inter-modulation component generated through coupling between the up-sweep and the down-sweep signal and a second harmonic component of the up-sweep or the down-sweep signal reflected by the reflective body. The image processing unit is connected to the signal receiving unit, and performs ultrasound harmonic imaging to obtain an ultrasound harmonic image according to the inter-modulation component and the second harmonic component of the up-sweep or down-sweep signal, so as to improve image quality of harmonic imaging.

10 Claims, 5 Drawing Sheets

(56) References Cited

U.S. PATENT DOCUMENTS

| | | | |
|---|---|---|---|
| 2004/0024313 A1* | 2/2004 | Moriya et al. | 600/437 |
| 2004/0236222 A1* | 11/2004 | Mao et al. | 600/458 |
| 2007/0167799 A1 | 7/2007 | Cai et al. | |
| 2010/0113933 A1* | 5/2010 | Bouakaz | 600/458 |
| 2010/0168575 A1* | 7/2010 | Hashiba | 600/443 |

OTHER PUBLICATIONS

Jung-Yu Lin, "Analysis of tissue harmonic signal based on third harmonic transmit phasing using annular array probe," Thesis of Master Degree, National Taiwan University of Science and Technology Department of Electrical Engineering, Jun. 2011, pp. 1-67.

"Office Action of Taiwan Counterpart Application", issued on Nov. 18, 2013, p. 1-p. 5.

* cited by examiner

APPARATUS FOR ULTRASOUND HARMONIC IMAGING AND METHOD THEREOF

CROSS-REFERENCE TO RELATED APPLICATION

This application claims the priority benefit of Taiwan application serial no. 101104563, filed on Feb. 13, 2012. The entirety of the above-mentioned patent application is hereby incorporated by reference herein and made a part of this specification.

BACKGROUND OF THE INVENTION

1. Field of the Invention

The invention relates to an apparatus for ultrasound imaging and a method therefor. Particularly, the invention relates to an apparatus for ultrasound harmonic imaging that uses linearly or non-linearly frequency modulated transmitting waveforms and a method thereof.

2. Description of Related Art

An ultrasound image is generally formed by a linearly reflected-back fundamental signal, and the fundamental signal is easy to be influenced by phase aberration to cause poor image quality. A harmonic signal is slowly generated by a sound wave transmitted in human tissues due to a finite amplitude distortion phenomenon, or is generated by intense non-linear media such as ultrasound microbubble contrast agents, etc. During tissue harmonic imaging, since an intensity of the harmonic signal is lower than an intensity of the fundamental signal in the beginning, when the sound wave is reflected back to a probe, a phase error thereof caused by a body superficial fat layer is relatively small, so that the tissue harmonic imaging is less influenced by the phase error, and has a higher image contrast resolution. Therefore, the tissue harmonic imaging is widely used in clinical diagnosis. During contrast agent harmonic imaging, the used contrast agent is composed of many microbubbles, and the microbubbles may produce resonance when being excited by the sound wave, and during the resonance, a plurality of intensive harmonic signals transmitted back to the probe is generated. Therefore, in clinical practice, the contrast agent is injected into blood vessels, so that the blood area also produces the intensive harmonic signal due to full of the microbubbles, which clarifies a vascular structure and blood perfusion, i.e. achieves a higher contrast.

A main difference between the ultrasound fundamental signal and the harmonic signal lies in a frequency range of the echo signals of the ultrasound fundamental signal and the harmonic signal. Imaging performed according to an echo signal of a frequency $f_0$ reflected by a reflective body is referred to as fundamental imaging. The harmonic imaging is to retrieve high frequency harmonic signals with frequencies of $2f_0$ and $3f_0$ for imaging. Since the harmonic signals are obtained through non-linear response of the medium on the incident sound wave, the harmonic imaging is also referred to as non-linear imaging. Therefore, by setting a receiving range to design a low frequency or high frequency filter, it is determined whether a fundamental image or a harmonic image is finally obtained. In the harmonic signals, a second harmonic signal generally has a larger strength, which is usually used and discussed.

Although the harmonic imaging draws attention in clinical diagnosis due to its higher image quality, a weak signal strength thereof results in a fact that an image sensitivity and penetration are all subjected to a considerable influence. For example, a strongest focus of the harmonic signal is still less than the fundamental signal for more than 20 dB. Some related researches and patents focus on increasing the harmonic strength in order to obtain higher quality ultrasound images.

SUMMARY OF THE INVENTION

The invention is directed to an apparatus for ultrasound harmonic imaging and a method thereof, in which the ultrasound harmonic imaging is implemented through a set of linearly or non-linearly frequency modulated transmitting signals.

In the invention provides an apparatus for ultrasound harmonic imaging including a signal transmitting unit, a signal receiving unit and an image processing unit. The signal transmitting unit transmits a transmitting signal to a reflective body, where the transmitting signal includes a linearly or non-linearly frequency modulated up-sweep signal and down-sweep signal. An instantaneous frequency of the up-sweep signal increases along with time, and an instantaneous frequency of the down-sweep signal decreases along with time. The signal receiving unit receives an inter-modulation component generated through coupling of the up-sweep and the down-sweep signal reflected by the reflective body, and receives a second harmonic component of the up-sweep signal or a second harmonic component of the down-sweep signal reflected by the reflective body. The image processing unit is connected to the signal receiving unit, and performs ultrasound harmonic imaging according to the inter-modulation component of the up-sweep signal and the down-sweep signal and the second harmonic component of the up-sweep signal or the second harmonic component of the down-sweep signal, so as to generate an ultrasound harmonic image.

The invention provides a method for ultrasound harmonic imaging, which includes following steps. First, a transmitting signal is transmitted to a reflective body, where the transmitting signal includes a linearly or non-linearly frequency modulated up-sweep signal and down-sweep signal. An instantaneous frequency of the up-sweep signal increases along with time, and an instantaneous frequency of the down-sweep signal decreases along with time. Then, an inter-modulation component generated through coupling of the up-sweep and the down-sweep signal reflected by the reflective body is received, and a second harmonic component of the up-sweep signal or the down-sweep signal reflected by the reflective body is received. Then, ultrasound harmonic imaging is performed according to the inter-modulation component and the second harmonic component, so as to generate an ultrasound harmonic image.

According to the above descriptions, the invention provides the apparatus for ultrasound harmonic imaging and the method thereof, by which a set of non-linearly modulated signals are transmitted to the reflective body, and the inter-modulation component or the second harmonic component reflected by the transmitting signal is received to carry on the ultrasound harmonic imaging.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

First, before various embodiments of the invention are described, an operation principle of the invention is first introduced. During non-linear harmonic imaging, besides transmitting a signal with a single frequency, a multi-frequency excitation method can also be used to simultaneously transmit signals of multiple frequencies through a transmitter. In this way, besides a second harmonic signal used in general harmonic imaging, the signal reflected by a reflective body further includes inter-modulation signals between the transmitting signals. Therefore, the inter-modulation signals can be used to improve quality of ultrasound imaging. However, both of the second harmonic signal or the inter-modulation signals are subjected to a poor signal to noise ratio.

Figure 1A:
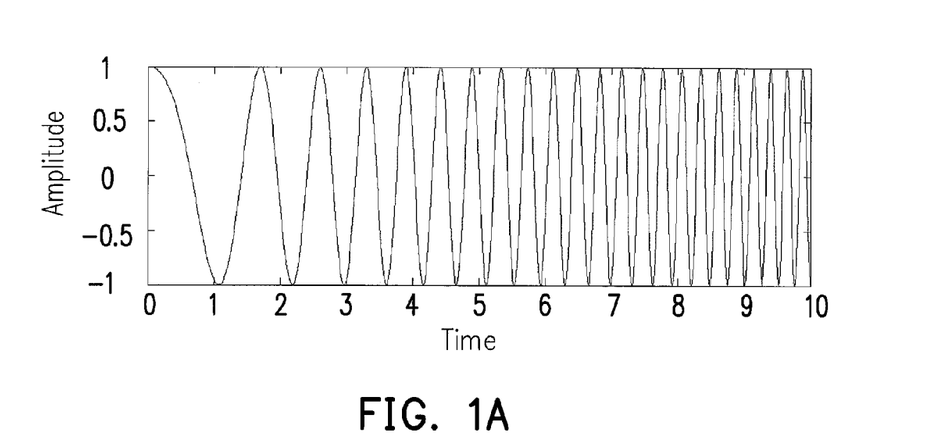
FIG. 1A is a signal waveform schematic diagram of an up-sweep chirp signal.
Figure 1B:
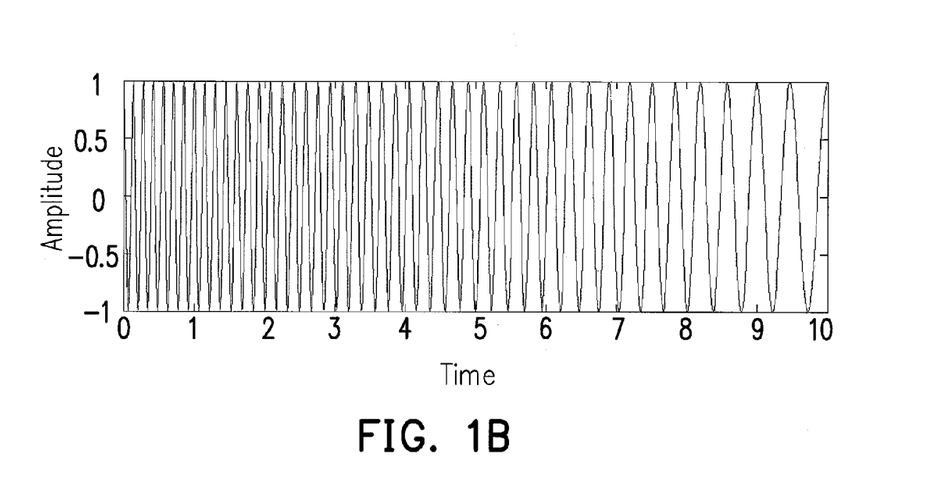
FIG. 1B is a signal waveform schematic diagram of a down-sweep chirp signal.
Figure 2A:
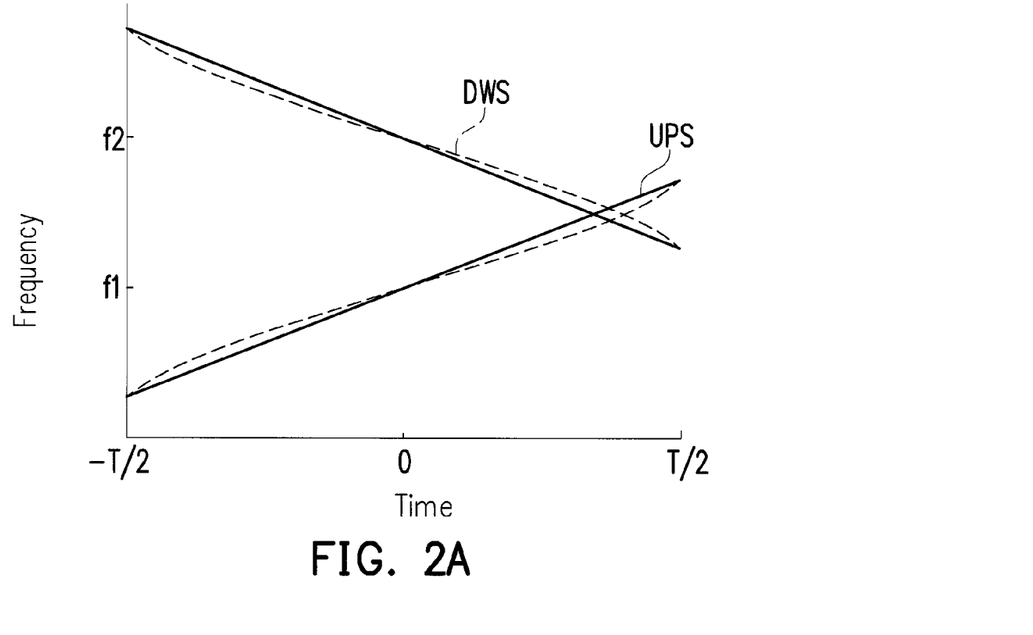
FIG. 2A is a schematic diagram illustrating a variation relationship between instantaneous frequencies of linear and non-linear chirp signals and time.
Figure 2B:
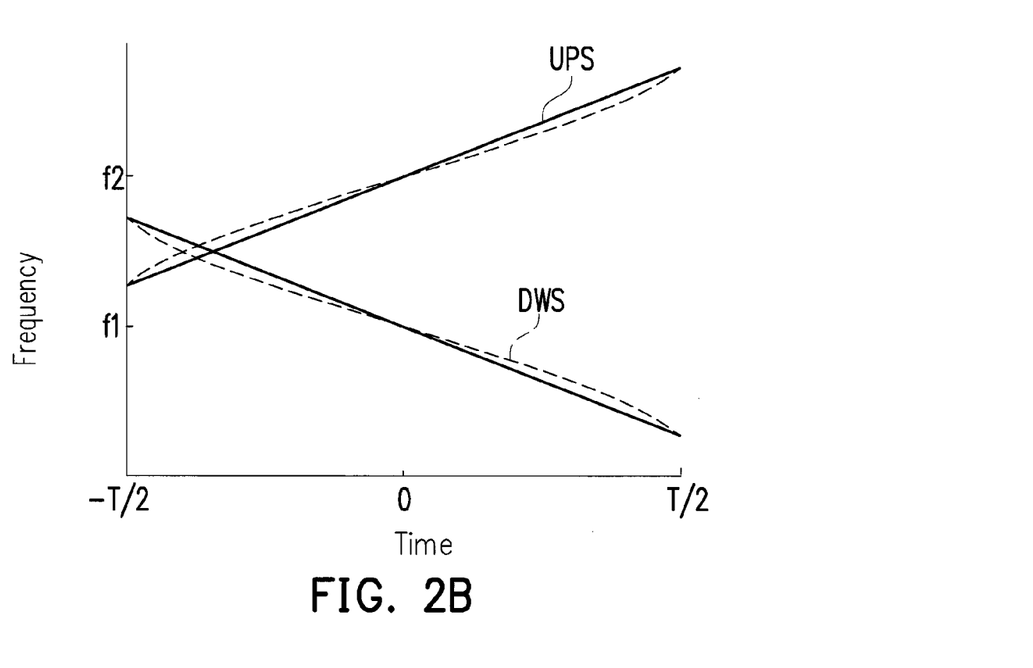
FIG. 2B is a schematic diagram illustrating a variation relationship between instantaneous frequencies of linear and non-linear chirp signals and time.

In the invention, at least one set of chirp signals is used for ultrasound imaging, the chirp signals may include an up-sweep signal and a down-sweep signal. Moreover, the up-sweep signal and the down-sweep signal are linearly or non-linearly modulated chirp signals, and an instantaneous frequency of the up-sweep signal is linearly or non-linearly increased along with time. FIG. 1A is a signal waveform schematic diagram of an up-sweep chirp signal, where the up-sweep chirp waveform refers to the chirp signal that a frequency thereof increases along with time. FIG. 1B is a signal waveform schematic diagram of a down-sweep chirp signal, where the down-sweep chirp waveform refers to the chirp waveform that a frequency thereof decreases along with time. FIG. 2 is a schematic diagram illustrating a variation relationship between instantaneous frequencies of the linear and non-linear chirp signals and time. A characteristic of the chirp signal is that an instantaneous frequency of a signal carrier thereof varies along with time. In order to avoid tissue damage of the reflective body caused by excessive instantaneous pressure of the signal, a peak amplitude of the transmitting signal generally has an upper limit. An advantage of using the chirp signal is that the transmitting signal can be elongated to increase transmitting energy to improve a signal-to-noise ratio (SNR) of the non-linear harmonic signals and maintain an axial resolution by pulse compression without increasing the peak amplitude of the transmitting signals.

FIG. 2A and FIG. 2B are schematic diagrams illustrating variation relationships between instantaneous frequencies of the linear and non-linear chirp signals and time, in which an up-sweep signal UPS and a down-sweep signal DWS are illustrated. Solid lines in FIG. 2A and IFG. 2B represent corresponding relations between the linearly modulated up-sweep signal UPS and down-sweep signal and time, and dot lines represent corresponding relations between the non-linearly modulated up-sweep signal UPS and down-sweep signal and time.

FIG. 2A illustrates a situation that a center frequency f2 of the down-sweep signal DWS is greater than a center frequency f1 of the up-sweep signal UPS. The instantaneous frequency of the up-sweep signal UPS is gradually increased from a frequency f1−Δf to a frequency f1+Δf within a pulse time length T, where Δf is a variation amount of frequency. The instantaneous frequency of the down-sweep signal DWS is gradually decreased from a frequency f2+Δf to a frequency f2−Δf within the pulse time length T. The instantaneous frequency $f_{i1}(t)$ of the up-sweep signal UPS and the instantaneous frequency $f_{i2}(t)$ of the down-sweep signal DWS can be represented by a following equation (1):

$$\begin{cases} f_{i1}(t) = f1 + s(t) \\ f_{i2}(t) = f2 - s(t) \end{cases} \quad (1)$$

Where, s(t) is a non-negative function linearly or non-linearly varied along with time, for example, the commonly used quadratic, logarithm and exponential, etc., though the invention is not limited to the above functions and combinations thereof. FIG. 2B illustrates a situation that the center frequency f1 of the down-sweep signal DWS is smaller than the center frequency f2 of the up-sweep signal UPS, where a variation relationship between the instantaneous frequencies of the two signals and time can be represented by a following equation (2), and detailed descriptions thereof are not repeated herein:

$$\begin{cases} f_{i1}(t) = f1 - s(t) \\ f_{i2}(t) = f2 + s(t) \end{cases} \quad (2)$$

In the reflected signal that is received from the reflective body, besides the second harmonic components of the up-sweep signal and the down-sweep signal, an inter-modulation component generated through coupling of the transmitting signals is also included, which includes a frequency sum component and a frequency difference component. According to the above equations (1) and (2), a instantaneous frequency $f_{i\_sum}(t)$ of the frequency sum component and a instantaneous frequency $f_{i\_diff}(t)$ of the frequency difference component are obtained, which are represented by following equations (3) and (4):

$$f_{i\_sum}(t) = f2 + f1 \quad (3)$$

$$f_{i\_diff}(t) = f2 - f1 \pm 2s(t) \quad (4)$$

Where, the frequency f2 is greater than the frequency f1, and the center frequencies of the up-sweep signal and the down-sweep signal are respectively one of the frequency f2 is greater than the frequency f1 (as that shown in FIG. 2A and FIG. 2B). According to the equation (3), it is known that the frequency sum component of the instantaneous frequency $f_{i\_sum}(t)$ a single-frequency sinusoidal with a narrow bandwidth, so that it is not liable to have a spectrum overlapping problem with other signals to cause mutual interference. Moreover, according to the equation (4), it is known that the instantaneous frequency $f_{i\_diff}(t)$ of the frequency difference component is also a chirp signal, and the instantaneous frequency is varied between a frequency (f2−f1)−2Δf and a frequency (f2−f1)+2Δf along with time. Therefore, the frequency difference component can maintain an axial resolution thereof through suitable compression and filtering, so as to improve quality of the non-linear ultrasound imaging.

Figure 3A:
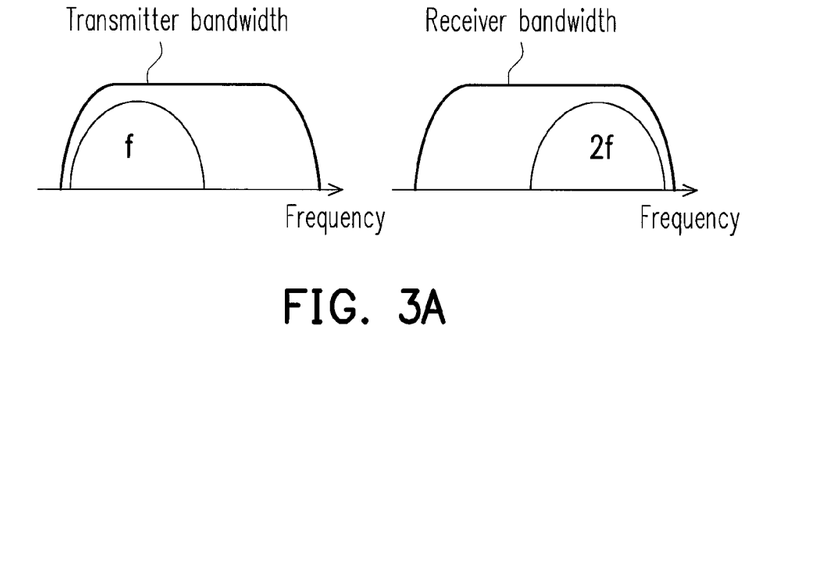
FIG. 3A is a spectrum schematic diagram of a transmitter and a receiver of a non-linear harmonic image probe in a general application.

Another problem of the non-linear harmonic imaging is that a bandwidth usage efficiency of a probe is poor. In an actual application, the transmitter and the receiver are generally integrated into a probe in a same device, and have a same setting bandwidth. FIG. 3A is a spectrum schematic diagram of a transmitter and a receiver of a non-linear harmonic image probe in a general application. Referring to FIG. 3A, since when a signal with a frequency f is transmitted, a bandwidth for receiving the second harmonic signal of a frequency 2f has to be reserved, the transmitter and the receiver can only use a half bandwidth of the probe.

Figure 3B:
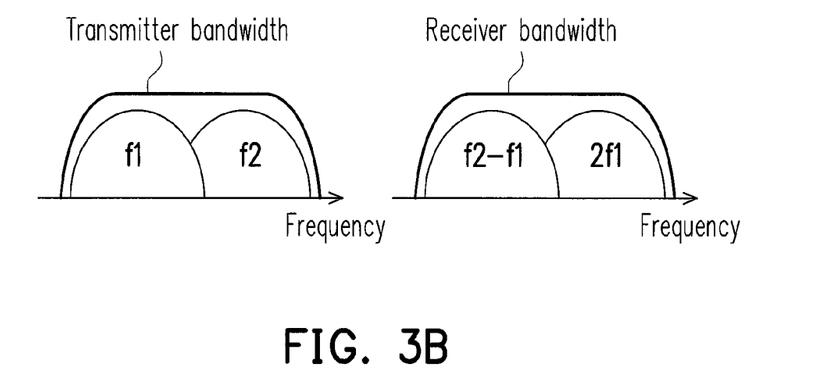
FIG. 3B is a spectrum schematic diagram of a transmitter and a receiver according to an embodiment of the invention.

FIG. 3B is a spectrum schematic diagram of a transmitter and a receiver according to an embodiment of the invention. Referring to FIG. 3B, when the transmitter transmits an up-sweep signal and a down-sweep signal respectively with center frequencies of f1 and f2, the receiver can use the same bandwidth to receive the second harmonic (center frequency 2f1) of the up-sweep signal and the frequency difference component (center frequency f2−f1) in the inter-modulation signal of the two transmitting signals that is used for improving the non-linear imaging quality. Therefore, based on the above bandwidth consideration in collaboration with implementations of the up-sweep chirp signal and the down-sweep chirp signal, besides the advantage of using the aforementioned implementations, the bandwidths of the transmitter and the receiver can be effectively used.

Figure 4:
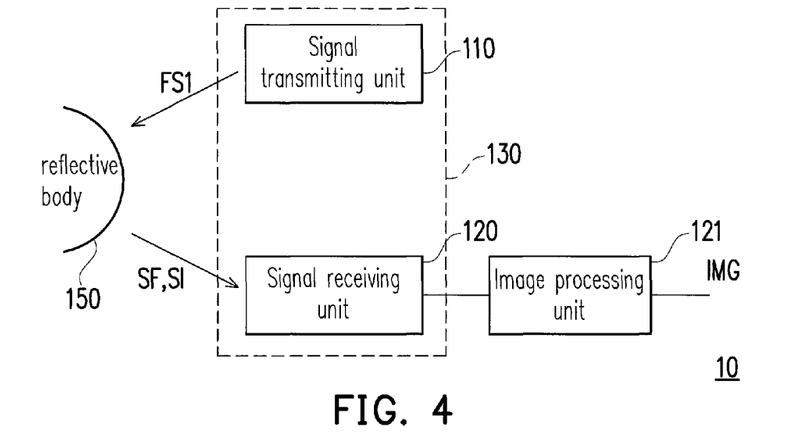
FIG. 4 is a functional block diagram illustrating an apparatus for ultrasound harmonic imaging according to an embodiment of the invention.

Embodiments of the invention are described in detail below. FIG. 4 is a functional block diagram illustrating an apparatus for ultrasound harmonic imaging according to an embodiment of the invention. Referring to FIG. 4, the apparatus for ultrasound harmonic imaging 10 includes a signal transmitting unit 110, a signal receiving unit 120 and an image processing unit 121. The signal transmitting unit 110 transmits a transmitting signal pair FS1 to a reflective body 150. It should be noticed that the signal transmitting unit 110 and the signal receiving unit 120 can be integrated into a probe 130, and share a same range of bandwidth. The transmitting signal pair FS1 includes an up-sweep signal and a down-sweep signal. In the present embodiment, an instantaneous frequency of the up-sweep signal linearly or non-linearly increases along with time, and an instantaneous frequency of the down-sweep signal linearly or non-linearly decreases along with time. Technical details of the up-sweep signal and the down-sweep signal have been described above, which are not repeated herein.

The signal receiving unit 120 receives a second harmonic component SF and an inter-modulation component SI reflected by the reflective body 150. Referring to FIG. 2A, when the center frequency of the up-sweep signal is smaller than the center frequency of the down-sweep signal (as that shown in FIG. 2A), the signal receiving unit 120 receives the second harmonic component (center frequency 2f1) of the up-sweep signal, and simultaneously receives the frequency difference component (center frequency f2−f1) in the inter-modulation signal SI of the up-sweep signal and the down-sweep signal. Similarly, referring to FIG. 2B, when the center frequency of the up-sweep signal is greater than the center frequency of the down-sweep signal (as that shown in FIG. 2B), the signal receiving unit 120 receives the second harmonic component (center frequency 2f1) of the down-sweep signal, and simultaneously receives the frequency difference component (center frequency f2−f1) in the inter-modulation signal SI of the up-sweep signal and the down-sweep signal. The image processing unit 121 receives the frequency difference component in the inter-modulation signal SI of the up-sweep signal and the down-sweep signal, and receives the second harmonic component of the up-sweep signal (or the second harmonic component of the down-sweep signal) from the signal receiving unit 120, and then performs ultrasound harmonic imaging according to the received signals, and outputs an ultrasound harmonic image IMG.

In another embodiment of the invention, the signal transmitting unit 110 can additionally transmit a supplementary signal with a frequency modulated chirp signal. Since the aforementioned principle is adapted to any dual-band combination of the transmitting signals in the multi-frequency excitation, according to the same principle, the signal receiving unit 120 receives the second harmonic component of the up-sweep signal, the second harmonic component of the down-sweep signal, a second harmonic component of the supplementary signal, and the inter-modulation component of the up-sweep signal and the down-sweep signal, an inter-modulation component of the up-sweep signal and the supplementary signal, and an inter-modulation component of the down-sweep signal and the supplementary signal that are reflected by the reflective body 150. Then, the image processing unit 121 performs ultrasound harmonic imaging according to the above signal components, and obtains the ultrasound harmonic image IMG. The second harmonic component SF and the inter-modulation component SI received by the signal receiving unit 120 are set according to the center frequencies of the up-sweep signal, the down-sweep signal and the supplementary signal and a setting of the bandwidth of the probe, though the invention is not limited thereto.

Figure 5:
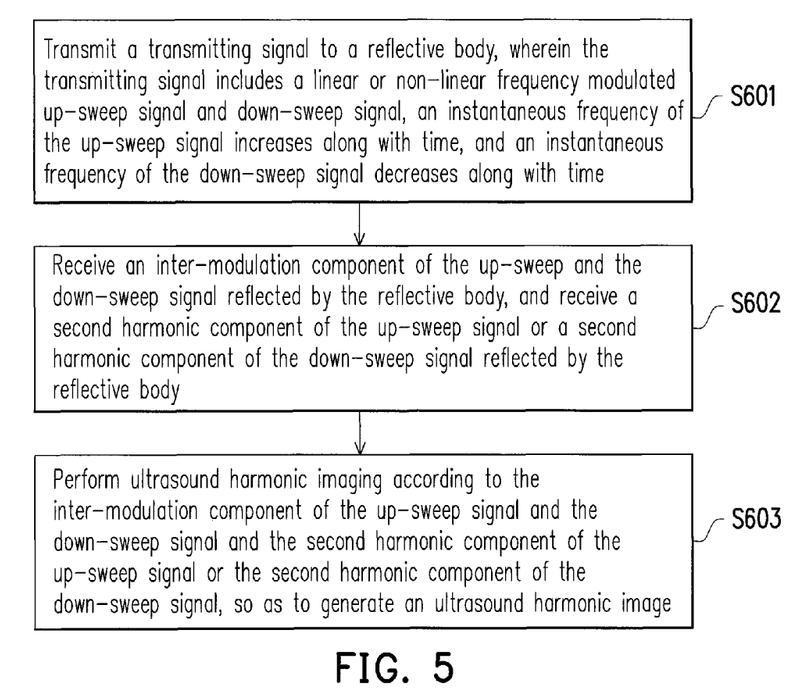
FIG. 5 is a flowchart illustrating a method for ultrasound harmonic imaging according to an embodiment of the invention.

FIG. 5 is a flowchart illustrating a method for ultrasound harmonic imaging according to an embodiment of the invention. Referring to FIG. 5, in step S601, a transmitting signal having a frequency modulated up-sweep signal and down-sweep signal is transmitted to a reflective body, where an instantaneous frequency of the up-sweep signal increases along with time, and an instantaneous frequency of the down-sweep signal decreases along with time. Then, in step S602, an inter-modulation component of the up-sweep and the down-sweep signal reflected by the reflective body is received, and a second harmonic component of the up-sweep signal or the down-sweep signal reflected by the reflective body is received. Then, in step S603, ultrasound harmonic imaging is performed according to the intermodulation component of the up-sweep signal and the down-sweep signal and the second harmonic component of the up-sweep signal or the down-sweep signal, so as to generate an ultrasound harmonic image. The aforementioned descriptions can be referred for implementation details of various steps of the present embodiment, which are not repeated herein.

Figure 6:
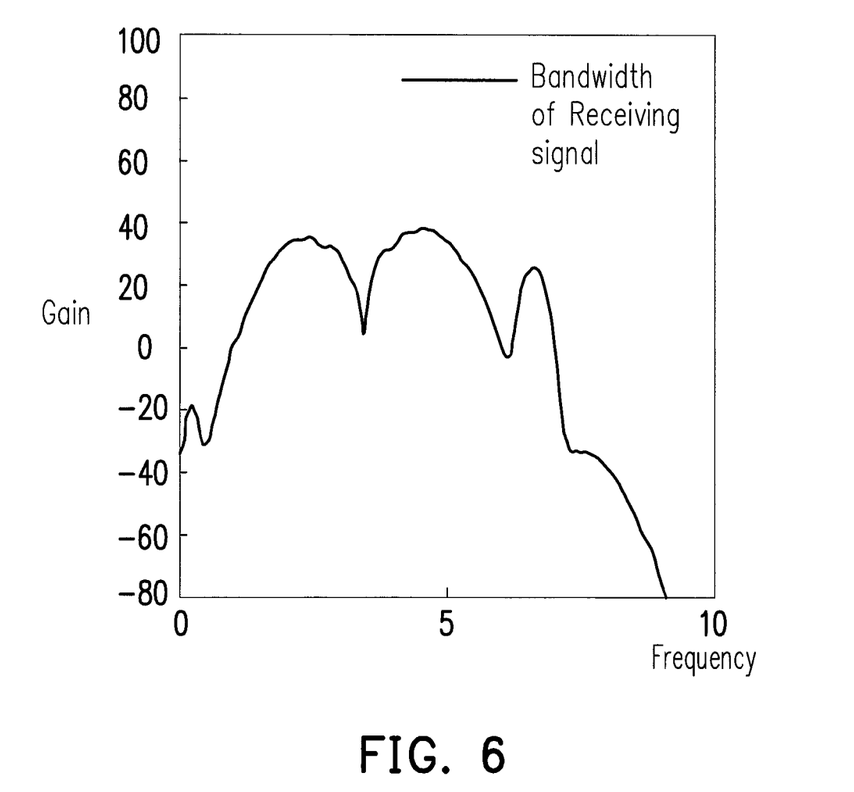
FIG. 6 is a simulation result according to an embodiment of the invention.

FIG. 6 is a simulation result according to an embodiment of the invention. Referring to the spectrum of FIG. 6, a solid line represents a bandwidth of a receiving signal reflected by the reflective body. In the simulation, the transmitting signals are set as a chirp signal with a center frequency of f1=2.25 MHz, and a chirp signal with a center frequency of f2=4.5 MHz both of which are linearly frequency modulated and have opposite sweeping directions. As a result, the frequency difference component of the inter-modulation component at the frequency of (4.5−2.25)=2.25 MHz is a wideband signal, and the bandwidth of the frequency difference component may have a same wideband with a second harmonic component at a frequency of 2×2.25 MHz=4.5 MHz. Therefore, according to the simulation result of FIG. 6, it is discovered that a signal bandwidth of the frequency difference component of the receiving signal at the frequency 2.25 MHz is close to a signal bandwidth of the second harmonic component at the frequency 4.5 MHz. Namely, both of the above have the same axial resolution. Moreover, the frequency sum component of the inter-modulation component at a frequency (4.5+2.25)= 6.75 MHz is a narrow band signal, so that the frequency sum component does not interfere the adjacent second harmonic component at the frequency 2×2.25 MHz=4.5 MHz. Although such simulation result uses the linearly frequency modulated chirp transmitting signals, the non-linearly frequency modulated chirp transmitting signals also vary in the same frequency range, so that a similar result can be obtained by using the non-linearly frequency modulated chirp transmitting signals.

In summary, the invention provides the apparatus for ultrasound harmonic imaging and the method thereof, by which a set of linearly or non-linearly frequency modulated chirp signals are used for ultrasound harmonic imaging, and the ultrasound harmonic imaging may have a better SNR. Meanwhile, signal bandwidth of the frequency difference component in the inter-modulation signal is maintained, and interference of the frequency sum component in the inter-modulation signal on the second harmonic imaging is avoided, so as to improve the image quality of the harmonic imaging.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An apparatus for ultrasound harmonic imaging, comprising:
   a signal transmitting unit, transmitting a transmitting signal to a reflective body, wherein the transmitting signal comprises a linearly or non-linearly frequency modulated up-sweep signal and a linearly or non-linearly frequency modulated down-sweep signal that are being transmitted simultaneously, wherein
   an instantaneous frequency of the up-sweep signal increases along with time; and
   an instantaneous frequency of the down-sweep signal decreases along with time, and a center frequency of the up-sweep signal is different from the center frequency of the down-sweep signal;
   a signal receiving unit, receiving an inter-modulation component of the up-sweep and the down-sweep signal reflected by the reflective body, and receiving a second harmonic component of the up-sweep signal or a second harmonic component of the down-sweep signal reflected by the reflective body; and
   an image processing unit, connected to the signal receiving unit, and performing ultrasound harmonic imaging according to the inter-modulation component generated through coupling of the up-sweep and the down-sweep signal and the second harmonic component of the up-sweep signal or the second harmonic component of the down-sweep signal, so as to generate an ultrasound harmonic image.

2. The apparatus for ultrasound harmonic imaging as claimed in claim 1, wherein the up-sweep signal and the down-sweep signal are linearly or non-linearly frequency modulated chirp signals.

3. The apparatus for ultrasound harmonic imaging as claimed in claim 1, wherein a center frequency of the up-sweep signal is greater than a center frequency of the down-sweep signal, and the signal receiving unit receives an inter-modulation frequency difference component of the up-sweep signal and the down-sweep signal, and the second harmonic component of the down-sweep signal to perform the ultrasound harmonic imaging.

4. The apparatus for ultrasound harmonic imaging as claimed in claim 1, wherein a center frequency of the up-sweep signal is smaller than a center frequency of the down-sweep signal, and the signal receiving unit receives an inter-modulation frequency difference component of the up-sweep signal and the down-sweep signal, and the second harmonic component of the up-sweep signal to perform the ultrasound harmonic imaging.

5. The apparatus for ultrasound harmonic imaging as claimed in claim 1, wherein the signal transmitting unit simultaneously transmits a supplementary signal to the reflective body, wherein the supplementary signal is a linearly or non-linearly frequency modulated chirp signal; and
   the image processing unit performs the ultrasound harmonic imaging to obtain the ultrasound harmonic image according to the inter-modulation component of the up-sweep signal and the down-sweep signal, the inter-modulation component of the up-sweep signal and the supplementary signal, the inter-modulation component of the down-sweep signal and the supplementary signal, and the second harmonic component of the up-sweep signal, the second harmonic component of the down-sweep signal, or a second harmonic component of the supplementary signal.

6. The apparatus for ultrasound harmonic imaging as claimed in claim 1, wherein the signal transmitting unit and the signal receiving unit are integrated as a probe.

7. A method for ultrasound harmonic imaging, comprising:
   transmitting a transmitting signal to a reflective body, wherein the transmitting signal comprises a linearly or non-linearly frequency modulated up-sweep signal and down-sweep signal that are being transmitted simultaneously, an instantaneous frequency of the up-sweep signal increases along with time, and an instantaneous frequency of the down-sweep signal decreases along with time, wherein a center frequency of the up-sweep signal is different from the center frequency of the down-sweep signal;
   receiving an inter-modulation component of the up-sweep and the down-sweep signal reflected by the reflective body, and receiving a second harmonic component of the up-sweep signal or a second harmonic component of the down-sweep signal reflected by the reflective body; and
   performing ultrasound harmonic imaging according to the inter-modulation component of the up-sweep signal and the down-sweep signal and the second harmonic component of the up-sweep signal or the second harmonic component of the down-sweep signal, so as to generate an ultrasound harmonic image.

8. The method for ultrasound harmonic imaging as claimed in claim 7, wherein a center frequency of the up-sweep signal is greater than a center frequency of the down-sweep signal, and an inter-modulation frequency difference component of the up-sweep signal and the down-sweep signal, and the second harmonic component of the down-sweep signal are received to perform the ultrasound harmonic imaging.

9. The method for ultrasound harmonic imaging as claimed in claim 7, wherein a center frequency of the up-sweep signal is smaller than a center frequency of the down-sweep signal, and an inter-modulation frequency difference component of the up-sweep signal and the down-sweep signal, and the second harmonic component of the up-sweep signal are received to perform the ultrasound harmonic imaging.

10. The method for ultrasound harmonic imaging as claimed in claim 7, wherein a supplementary signal is further transmitted to the reflective body, wherein the supplementary signal is a linearly or non-linearly frequency modulated chirp signal; and the ultrasound harmonic imaging is performed to obtain the ultrasound harmonic image according to the inter-modulation component of the up-sweep signal and the down-sweep signal, the inter-modulation component of the up-sweep signal and the supplementary signal, the inter-modulation component of the down-sweep signal and the supplementary signal, and the second harmonic component of the up-sweep signal, the second harmonic component of the down-sweep signal, or a second harmonic component of the supplementary signal.

* * * * *